March 22, 1927.
P. O. DORER
1,621,769
MEANS FOR OPERATING AUXILIARY APPARATUS ON MOTOR DRIVEN VEHICLES
Filed Jan. 7, 1925
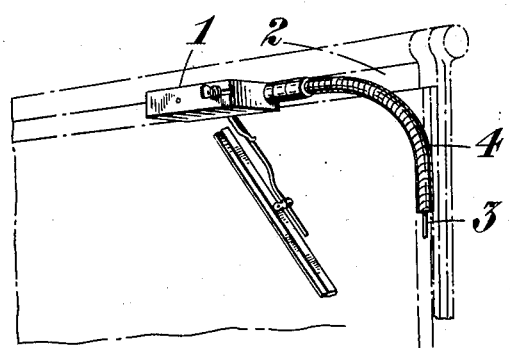
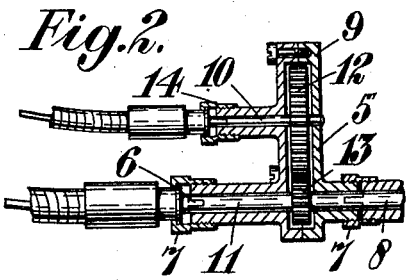
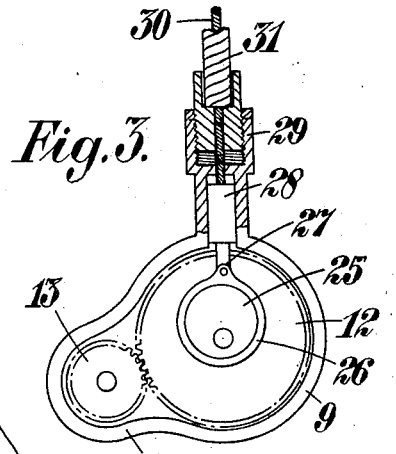
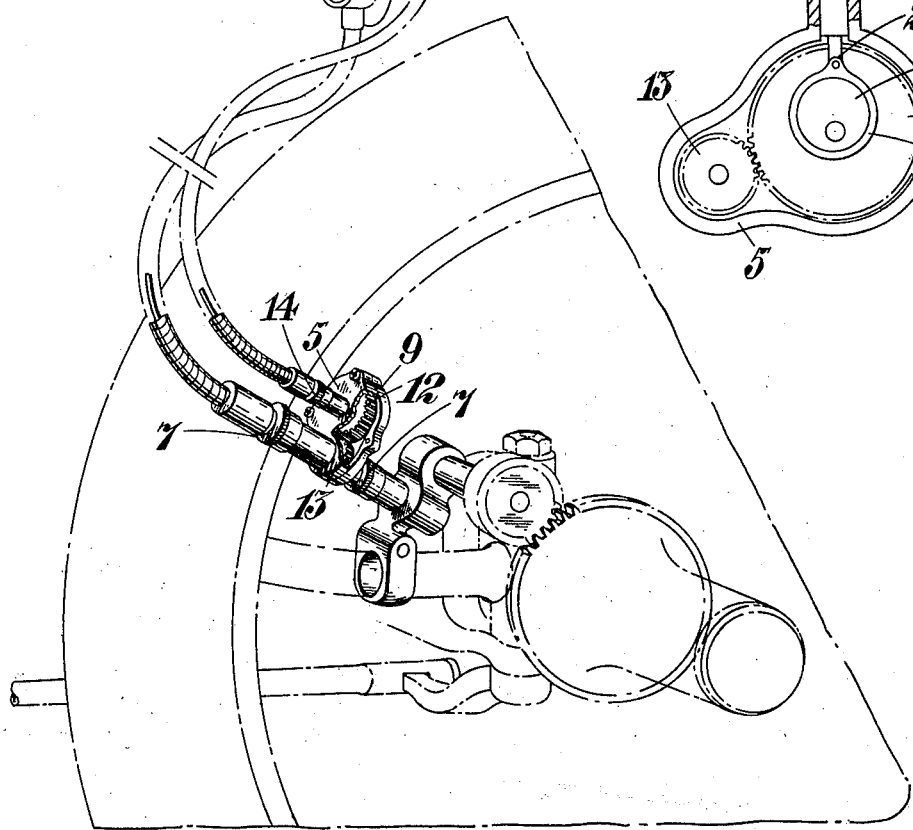
INVENTOR
Primus Otto Dorer,
By Watson, Coit, Morse + Grindle
ATTYS.

Patented Mar. 22, 1927.

1,621,769

UNITED STATES PATENT OFFICE.

PRIMUS OTTO DORER, OF LEE, LONDON, ENGLAND, ASSIGNOR TO ALLAN GORDON SMITH, OF LONDON, ENGLAND.

MEANS FOR OPERATING AUXILIARY APPARATUS ON MOTOR-DRIVEN VEHICLES.

Application filed January 7, 1925, Serial No. 1,125, and in Great Britain January 11, 1924.

This invention is for improvements in and relating to means for operating auxiliary apparatus and appliances from the running parts of motor vehicles and their engines and has for an object to provide a mechanism which may be easily attached to an existing driving member.

According to this invention there is provided a driving unit for application to a drive for a motor vehicle, which drive is provided with a detachable coupling comprising driving and driven elements. The said driving unit is capable of being inserted between the said elements and comprises a plurality of driven shafts one of which becomes the driving member for the previously disconnected driven element and the other or others become the auxiliary drives.

It will be appreciated that, with this arrangement, a number of drives are provided in addition to that for the original driven elements. These drives may be used, for example, for operating a wind-screen wiper, speedometer fan, etc.

According to a feature of this invention the driven shafts are located in a casing and are geared to one another, and one shaft has at one end a detachable connection corresponding to the previously displaced driven element, and at the other end a detachable connection corresponding to the driving element of the coupling. In order to attach the unit, it will be appreciated that the detachable coupling is separated and the aforementioned shaft is inserted so as to form a connecting piece between the two elements. A straight through drive will, therefore, be provided for the original driven element.

A further feature of the invention consists in arranging the gearing between one shaft and another to be other than 1:1. Thus, if the existing drive is arranged for a speedometer and if this is too fast for operating a wind-screen wiper, one of the said shafts may be geared so as to rotate at a reduced speed to that of the existing driving element.

A further feature of the invention consists in mounting upon one of the said shafts, a cam-like member and arranging a guide in the casing for a reciprocating rod which engages the cam-like member. With this arrangement, a reciprocating drive is provided by the driving unit. This reciprocating drive may be utilised, for example for operating a wind-screen wiper.

The following is a description of the driving unit and of its application for driving a wind-screen wiper from a driving element which is designed for operating the speedometer.

Figure 1 shows a driving unit inserted between an existing detachable coupling for a speedometer drive, which unit is used for driving both a screen-wiper and speedometer.

Figure 2 shows a section through the driving unit;

Figure 3 shows an arrangement in which the driving unit is arranged to provide a reciprocating drive.

Like reference numerals in Figures 1, 2 and 3 indicate like parts.

In Figure 1 a wiper mechanism 1 is shown secured to a top member 2 of a wind-screen and is driven by a flexible member 3, formed from wire cable, which is surrounded by a stationary flexible sheath 4. The flexible member is driven through a driving unit 5 (best shown in Figure 2) which is arranged for application to a speedometer drive 6 provided with the usual detachable connection 7 to a driving member 8. The connecting unit 5 comprises a casing 9 in which are located two shafts 10 and 11. The shaft 11 has one end shaped to engage with the speedometer driving element 8 and the other end shaped to engage with the speedometer driven element 6. The shaft 10 is detachably connected to the aforementioned flexible member. The two shafts are geared one to the other through gearing 12, 13 which is arranged to drive the flexible element at a reduced speed in relation to the speedometer drive. The casing surrounding the shaft 11 is secured to the speedometer driven element by the aforementioned detachable connection 7 which comprises an internally-screwed collar, and a similar detachable connection 7 is provided for securing the casing to a stationary part of the speedometer driving element. A similar connecting collar 14 is provided for securing the sheath 4 of the flexible element to the connecting unit.

Figure 3 shows the connecting unit arranged so as to provide a reciprocatory motion for the flexible element. An eccentric 25 is secured to the larger gear wheel 12. A strap 26 is arranged around the eccentric and is pivotally connected at 27 to a rod 28 secured to the flexible member. The casing 9 is provided with a guideway 29 which forms a bearing for the said rod. The flexible member may take the form of a Bowden wire 30 surrounded by a sheath 31.

I claim:—

In combination, a disconnectible transmission line, a casing, a shaft journaled in said casing and adapted for operative attachment to the disconnected transmission members, a spur gear on said shaft within said casing, an auxiliary shaft journaled in said casing parallel to said first mentioned shaft, a second spur gear of different size on said auxiliary shaft also within said casing and in mesh with said first mentioned spur gear, an eccentric secured to said second spur gear, a strap cooperating with said eccentric, a rod pivoted to said strap, a flexible wire member connected to the rod and passing through said casing, and a tubular guideway on said casing forming a bearing for said rod.

In testimony whereof I affix my signature.

PRIMUS OTTO DORER.